US009646328B1

United States Patent
Skifstrom et al.

(10) Patent No.: US 9,646,328 B1
(45) Date of Patent: May 9, 2017

(54) INTERACTIVE POINT OF PURCHASE DISPLAY FOR TOYS

(75) Inventors: Eric E. Skifstrom, Manhattan Beach, CA (US); Peter E. Teel, Los Angeles, CA (US); Vladimir Buzga, Torrance, CA (US); Mary M. Hinkley, Pasadena, CA (US); Vladimir Sosnovskiy, North Hollywood, CA (US)

(73) Assignee: Mattel, Inc., El Segundo, CA (US)

( * ) Notice: Subject to any disclaimer, the term of this patent is extended or adjusted under 35 U.S.C. 154(b) by 596 days.

(21) Appl. No.: 13/325,963

(22) Filed: Dec. 14, 2011

Related U.S. Application Data

(60) Provisional application No. 61/422,883, filed on Dec. 14, 2010.

(51) Int. Cl.
  *G06Q 30/00*  (2012.01)
  *G06Q 30/02*  (2012.01)
  *G06Q 20/20*  (2012.01)
  *G06Q 99/00*  (2006.01)

(52) U.S. Cl.
  CPC ......... *G06Q 30/0269* (2013.01); *G06Q 20/20* (2013.01); *G06Q 30/0241* (2013.01); *G06Q 30/0251* (2013.01); *G06Q 99/00* (2013.01)

(58) Field of Classification Search
  CPC .... G06Q 30/06; G06Q 30/02; G06Q 30/0613; G06Q 30/0617; G06Q 30/0641; G06Q 30/0267; G06Q 30/00; G06Q 30/0241; G06Q 30/0269; G06Q 30/0251; G06Q 20/20; G06Q 99/00
  USPC ............................................... 705/26.1, 27.1
  See application file for complete search history.

(56) References Cited

U.S. PATENT DOCUMENTS

| | | | | |
|---|---|---|---|---|
| 5,880,449 A | * | 3/1999 | Teicher ................ | G06Q 20/343 235/375 |
| 6,982,649 B2 | * | 1/2006 | Blum ..................... | A47L 23/22 340/572.1 |
| 7,152,040 B1 | * | 12/2006 | Hawthorne .......... | G06Q 10/087 235/380 |
| 7,252,572 B2 | | 8/2007 | Wright et al. | |
| 7,778,942 B2 | * | 8/2010 | Naito ..................... | G06Q 30/06 353/28 |
| 2002/0013144 A1 | * | 1/2002 | Waters ..................... | G09F 3/00 455/414.1 |

(Continued)

OTHER PUBLICATIONS

"Are you experiential?" by Ann Meyer, Multichannel Merchant 23.8 (Aug. 1, 2006).*

*Primary Examiner* — Anne Georgalas
(74) *Attorney, Agent, or Firm* — Edell, Shapiro & Finnan, LLC

(57) ABSTRACT

Techniques are provided for an interactive point of purchase product display. The interactive point of purchase product display includes a product placement region, one or more products located in the product placement region, an input device configured to receive an input signal, a controller device, and a selection indicator device. The input device may receive data about a potential consumer or customer. The controller device is coupled to the input device and the one or more products and is configured to receive data from the input device responsive to the input signal, select a product in response to the receive input and generate a selection signal identifying the product resulting in the attention of a customer to be drawn to the product.

20 Claims, 14 Drawing Sheets

(56) References Cited

U.S. PATENT DOCUMENTS

| | | | |
|---|---|---|---|
| 2002/0106624 A1* | 8/2002 | Chan | A63H 3/50 434/393 |
| 2003/0040922 A1* | 2/2003 | Bodin | G06Q 10/087 705/1.1 |
| 2005/0101314 A1* | 5/2005 | Levi | H04L 63/0861 455/423 |
| 2005/0177463 A1* | 8/2005 | Crutchfield, Jr. | G06Q 30/06 705/26.9 |
| 2006/0273909 A1 | 12/2006 | Heiman et al. | |
| 2007/0090185 A1* | 4/2007 | Lewkowitz | G06Q 20/343 235/383 |
| 2007/0182555 A1* | 8/2007 | Walker et al. | 340/572.1 |
| 2008/0194175 A1* | 8/2008 | Last et al. | 446/302 |
| 2011/0288938 A1* | 11/2011 | Cook et al. | 705/14.66 |

* cited by examiner

INTERACTIVE POINT OF PURCHASE DISPLAY FOR TOYS

CROSS-REFERENCE TO RELATED APPLICATIONS

This application claims priority under 35 U.S.C. §119 to U.S. Provisional Patent Application Ser. No. 61/422,883, filed Dec. 14, 2010, and entitled INTERACTIVE POINT OF PURCHASE DISPLAY FOR TOYS, the complete disclosure of which is incorporated herein by reference for all purposes.

FIELD OF THE INVENTION

The disclosure relates generally to a point of purchase display. More specifically, the point of purchase display interacts with a potential consumer.

BACKGROUND

Point of purchase displays provide opportunities to engage potential consumers or customers and inform the consumer about the products on display. Point of purchase displays can be as simple as a decorated cardboard prop or sign in the store aisle. Other, more elaborate, point of purchase displays include "TRY ME" features on individual toys that demonstrate one or more particular features of the toy while the toy is still on the shelf and in its original packaging. In-aisle dioramas include staged displays of a toy outside of its original packaging and under controlled settings. A diorama may require more shelf space than the packaged toy, but it allows for a more complete demonstration of the toy's capabilities. For example, a diorama for the D-REX toy from MATTEL, INC. may permit the D-REX toy to walk a short distance to retrieve a bone-shaped remote controller at the pull of a lever. A demonstration of the toy's ability to walk and follow the remote controller may not be possible while the toy is in its original packaging. The diorama may be enclosed to prevent potential consumers from disrupting the staged demonstration.

Some toys and toy-based systems can provide an interactive experience for a consumer. For example, U.S. Pat. No. 7,252,572 B2 ("Wright") is directed to figurines having interactive communication. The Wright figurines form and join a network of figurines by setting them near other figurines, by activating them via a power switch, or by placing them in communication with a central hub. A communications path is used to form the network, such that only one figurine can transmit data while the others receive data at any time. The figurines can formulate behaviors based on the attributes, requests, and actions of the others. Each figurine has a personality controlled by its internal data, which also controls its relationships with others. The Wright figurines, however, are adapted for different patterns of play or use with games and not for providing the consumer with selection information or an interaction during point of purchase situations.

U.S. Patent Application Publication No. 2006/0273909 A1 ("Heiman") is directed to a radio frequency identification (RFID)-based toy and system. The Heiman system includes a wireless transmitter and a RFID antenna array adapted to transmit information representative of the RFID tags located within the array's reception area. The Heiman toy includes an RFID reader adapted to interact with RFID tags and an interface that allows the toy to exchange signals with a computerized entity. The system includes multiple toys adapted to interact with each other where each toy exchanges signals, directly or indirectly, with another toy. The Heiman system is also adapted for use in various games and not for point of purchase situations. The Wright and Heiman references are herein incorporated by reference in their entirety.

SUMMARY

The disclosure includes an interactive point of purchase display and methods of selecting one or more products at an interactive point of purchase display. The interactive point of purchase display may include a product placement shelf or region, one or more products located within the product placement region, an input device, a control device (e.g. a "controller device"), and a selection indicator device. The controller device may be configured to receive data from the input device responsive to an input signal, select a product in response and generate a selection signal identifying the selected product. The selection indicator device may be configured to receive the selection signal from the controller device and activate a presentation that causes attention of a potential customer to be directed to the selected product. The methods may include the controller device receiving input data from the input device, selecting one of a plurality of the products at the point of purchase display as a selected product in response to receiving the data, generating a selection signal identifying the selected product and sending the selection signal to at least one selection indicator device that corresponds to the selected product and that is configured to draw attention to the selected product.

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The interactive point of purchase product display may be better understood with reference to the following drawings and description. The elements in the figures are not necessarily to scale, emphasis instead being placed upon illustrating the principles of the product display. In the figures, like-referenced numerals designate corresponding parts throughout the different views.

DETAILED DESCRIPTION

Techniques are provided for an interactive point of purchase product display. The interactive point of purchase product display includes a product placement shelf (or "product placement region"), one or more products located in the product placement region, an input device configured to receive an input signal, a control device (or "controller"), and a selection indicator device. The input device may receive data about a potential consumer or customer. The controller device is coupled to the input device and the one or more products and is configured to receive data from the input device responsive to the input signal, select a product in response to the receive input and generate a selection signal identifying the product. For example, the control device selects one of the products based on the data received about the potential consumer or customer. The selection indicator device is coupled to the product and the controller device and is configured to receive the selection signal from the controller device and activate a presentation that causes attention of a potential customer to be directed to the product. The selection indicator, for example, indicates to the potential consumer or customer which product the selection device selected. A product presentation may be performed drawing from the input data.

Figure 1:
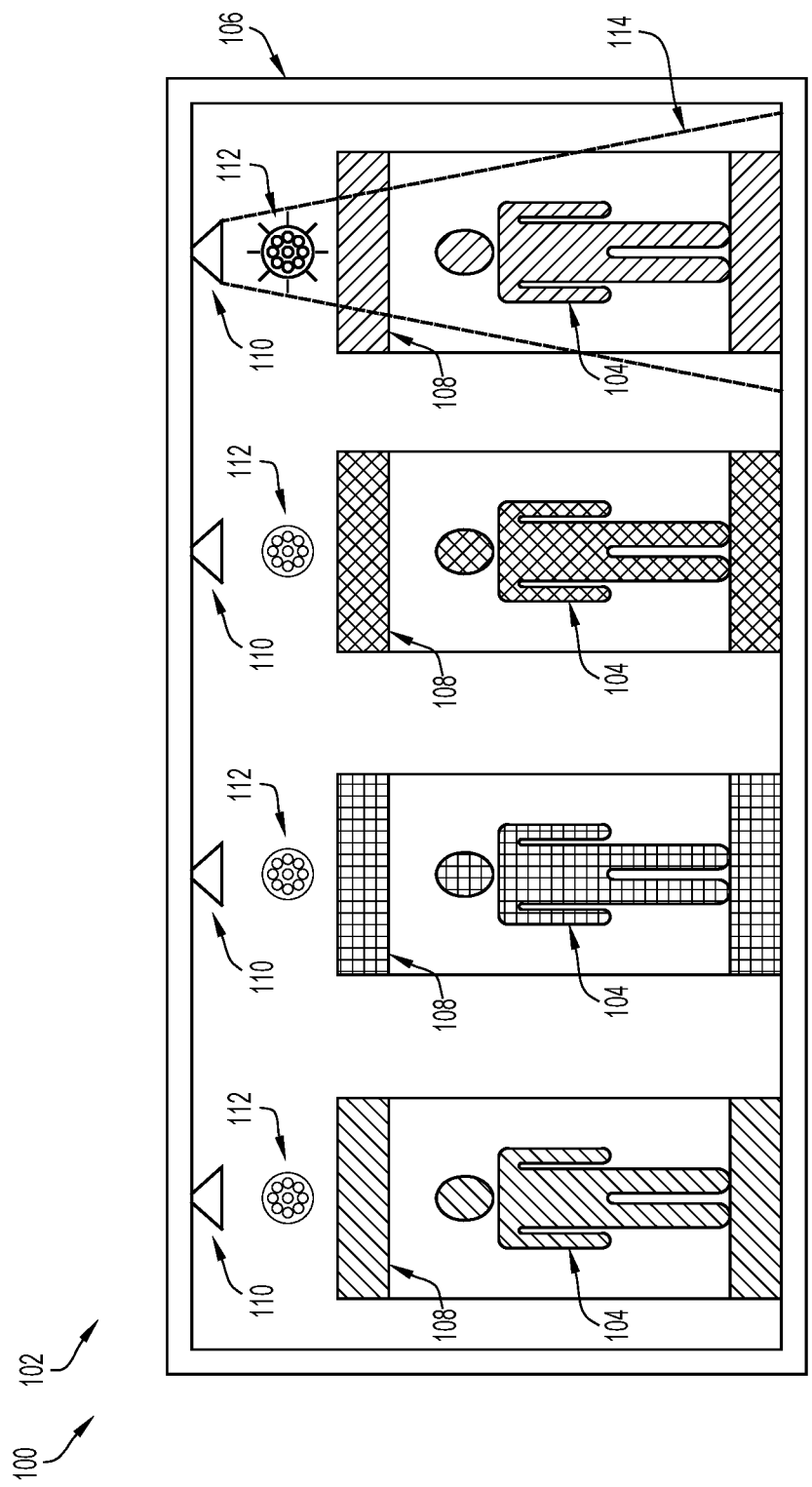
FIG. 1 is an illustration of an interactive point of purchase product display indicating the selection of a product for a potential consumer or customer.

FIG. 1 is an illustration 100 of an interactive point of purchase product display 102 indicating the selection of a product 104 for a potential consumer (also referred to as a "potential customer"). In this example, the product 104 is one of four products on a shelf 106. Shelf 106 may be any region (e.g., a product placement region) or other area where products are located or displayed. For example, the shelf 106 may include racks, hangers, pegs, tables, vending machines, and one or more portions of a larger shelf that hosts a variety of other products, among other things. The products may include any commercial or consumer good, such as produce, electronics, household goods, textiles, games, and toys. Each product 104 in this instance is a toy figurine or action figure. Each of the four products is of a different color (illustrated by solid black, square checker, diamond checker, and diagonal stripe patterns, respectively). Each product 104 is individually enclosed within packaging 108 from the product manufacturer or distributor.

The shelf 106 provides a region where the products may be displayed and offered for sale to potential consumers. The products on the shelf 106 may be arranged one or more layers deep, but for this example only a single layer is illustrated. The shelf 106 may be dimensioned such that the products are located at predefined positions. For example, the shelf 106 may have a sufficient width for four toy figurine packages to be displayed comfortably across its front display area. Each package 108 then occupies a predefined position at the front of the shelf 106 that is determined by the width of each package with respect to the width of the shelf. In a similar manner, the depth of the shelf may also provide predefined positions with respect to the depth of each package. Thus, the surface area of the shelf 106 may be thought of as a grid of positions where the packages may be arranged and displayed. Alternatively, the shelf 106 may include a physical feature to aid in orienting each package 108 into a predefined position. For example, the physical feature may include one or more grooves, slots, or indentations into which the package 108 or a part of the package 108 may fit.

One or more selection indicators (also referred to as "selection indicator devices") may indicate selection of the product 104 to the potential consumer. In this embodiment, the selection indicators may include a light source unit 110 and an audio source unit (e.g., a speaker) 112. The light source 110 illuminates the selected product 104 with a light cone 114, thus drawing or bringing the potential consumer's attention to the selected product 104 by making it stand out from the others. The audio speaker 112 may emit audible signals from a location near, on, or about the selected product 104. The audible signals may include an attention-gathering tone or sound, or they may include a recorded or synthesized voice announcement enticing or indicating to a potential customer that the potential customer should purchase the selected product 104. For example, the audible signals may include signals such as "Pick me! I am the one for you!" The selection indicators may be tailored to the shelf space, such as by arranging a selection indicator for each position within the shelf grid. Alternatively, the selection indicators may be tailored to the products on the shelf 106, such as by incorporating a selection indicator device within each product 104 or product package 108. The selection indicator devices may also have a mechanical animation unit (not shown) to provide mechanical movements for the product 104.

Figure 2:
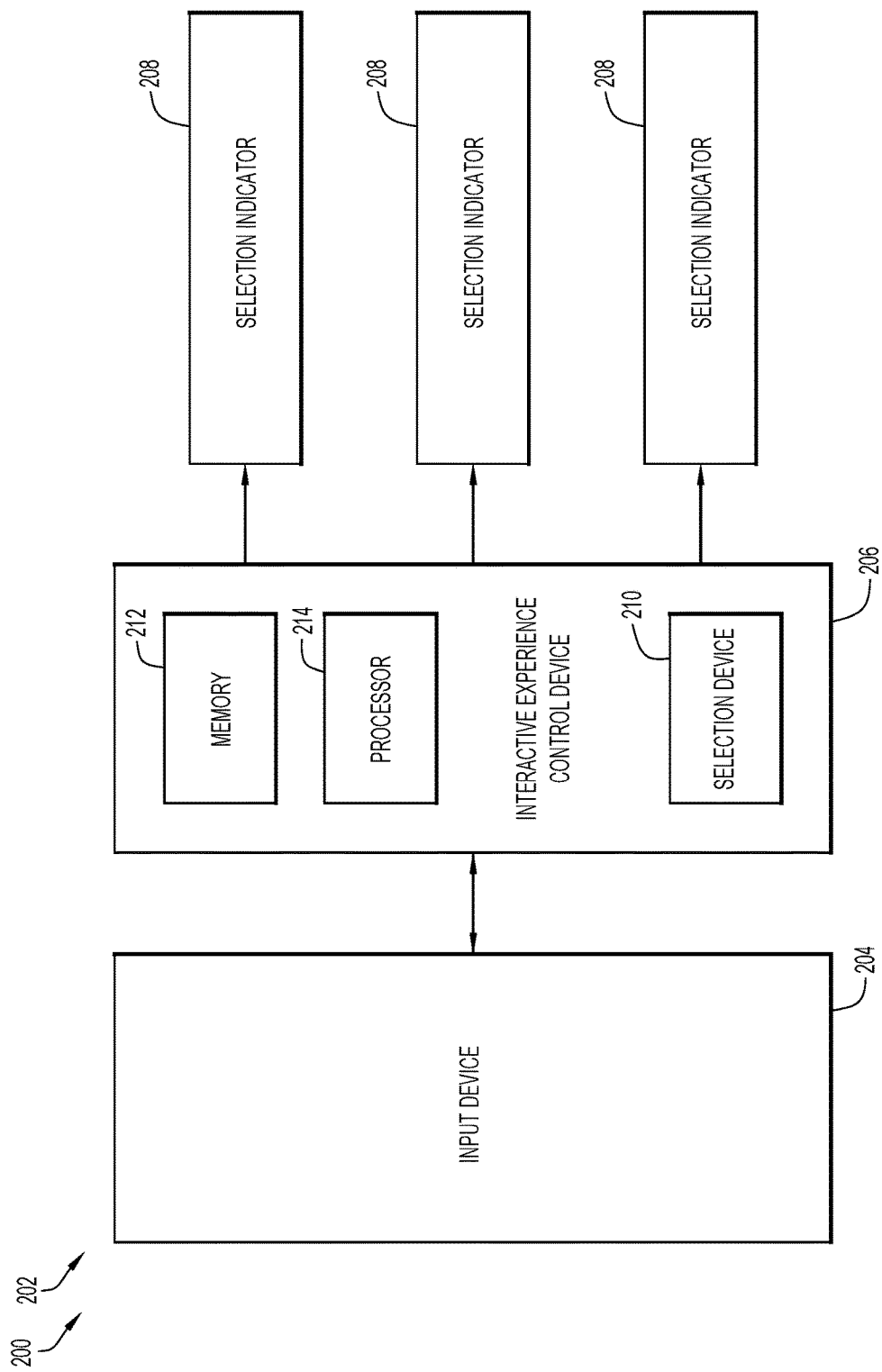
FIG. 2 is a diagram of a control system for the interactive point of purchase product display according to one embodiment of the present invention.

FIG. 2 is a diagram 200 of a control system 202 for an interactive point of purchase product display 102 according to one embodiment of the present invention. The control system 202 includes an input device 204, an interactive experience control device (also referred to as a "controller device") 206 and one or more selection indicator devices 208. The input device 204 provides data to the control device 206. For example, the input device 204 may signal to the control device 206 that a potential consumer is within an interactive range of the product display 102. In this example, the input device 204 may be a motion detector, or a button on the product display that the potential consumer pushes. Alternatively, the input device 204 may provide data that the control device 206 may use to personalize an interactive experience with the potential consumer. For instance, the input device 204 may be a camera that sends image information from a bar code or quick response (QR) code presented by the potential consumer and detected by the input device 204. In another example, the input device 204 may be configured to send data to the control device 206 that comprises information from a wireless/modulated signal generated by an application on a mobile device and detected by the input device 204. The image information from the bar code may be decoded by the control device 206 to provide the name, other identification information, or personal preferences of the potential consumer. In another example, the input device 204 may be an activation button, a bar code scanner device, an optical scanner device, a Bluetooth receiver device, a radio frequency receiver device, a cellular communications device, a computer terminal or a microphone.

The control device 206 processes the information received from the input device 204 and controls the selection indicators 208 based on the processed information. In one example, the control device 206 may be integrated within one or more of the products 104. The control device 206 includes a selection device 210, a memory 212 and a processor 214. The selection device 210 may be dedicated hardware, or it may be software running in the memory of a processor. The control device 206 feeds or sends the processed information to the selection device 210 of the control device 206. The selection device 210 selects a product 104 based on the processed information. In one example, functions of processor 214 may be implemented by logic encoded in one or more tangible media or storage devices (e.g., memory devices such as compact discs, digital video discs, flash memory drives, etc. and embedded logic such as an application specific integrated circuit (ASIC), digital signal processor (DSP) instructions), wherein memory 212 stores data used for the computations or functions described herein. Thus, the operations performed by the control device 206 may be implemented with fixed logic executed by a processor. The selection device 210 may access a memory 212 from which it retrieves information about the products. For example, the selection device 210 may receive information that the potential consumer prefers the color represented by the 'diagonal stripe pattern'. The selection device 210 accesses the memory 212 to determine whether a product 104 with the preferred color is on the shelf 106, and if so, the selection device 210 then selects that product 104 for the potential consumer. If a product 104 with the preferred color is not on the shelf 106, then the selection device 210 may access the memory 212 to determine what products are on the shelf 106 and make a selection from one of those products.

The selection device 210 may generate a selection signal that identifies the selected product. The control device 206 sends the selection signal to a corresponding selection indicator 208 for the selected product 104. In one example, the control device 206 sends the selection signal to the selection indicator 208 via wireless transmission to the selected product 104. The selection signal may be a signal that activates the selection indicator 208. For example, the selection signal may activate a motor that causes a selected toy figurine to mechanically animate. Alternatively, the selection signal may include information about the potential consumer. For example, the control device 206 may receive data from the input device 204 and may process the data received from the input device 204 to obtain identity information associated with a potential consumer or customer that has caused the input device 204 to send the data. In one embodiment, the control device 206 processes the data received from the input device to obtain product criteria information associated with the potential customer from a database storing product preferences associated with the potential customer. The control device 206 may select the selected product based on the identity information or product criteria information associated with the potential customer.

In some embodiments, the control device 206 may send the name of the potential consumer to the selection indicator 208, and the selection indicator 208 may incorporate the consumer's name into its indication. For example, the control device 206 may send the name "Alice", and the selection indicator 208 may include an LED scrolling display screen, which may display the message "Look at me, Alice! I am your favorite color!" The control device 206 may access the memory 212 to determine the appropriate selection indicator 208 to activate.

The control device 206 may control the input device 204 to solicit further information about the potential consumer. For example, once the control device 206 receives information that a potential consumer is within a predetermined distance or interactive range, the control device 206 may request a visual image of the potential consumer from a camera so that it may determine what color of clothing the potential consumer is predominantly wearing. The control device 206 may send or feed that color information to the selection device 210 to determine a color preference for the potential consumer. Alternatively, the control device 206 may actively request input data from the potential consumer. In some embodiments, the control device 206 sends signals to a computer monitor that displays a message to the consumer requesting the consumer to enter their preferences using a computer keyboard or other conventional computer input, such as a touch screen, trackball, and mouse, among other things.

The input device 204 may also include one or more sensors used to monitor one or more properties of the products 104 or product packaging 108. The properties may include product location, product type, and battery life, among other things. The information about the product properties may be stored in the memory 212 and may be used by the selection device 210 in the selection process. For example, commercial products are often provided with limited lifespan batteries for demonstration purposes only. The selection device 210 may select a toy figurine with the lowest remaining demonstration battery life as the selected product 104. Such sensors may include a radio frequency (RF) identification (RFID) system, including those disclosed by Heiman or U.S. Pat. No. 6,392,544 B1 ("Collins", herein incorporated by reference in its entirety), an inductive sensing system, including ones similar to the disclosure of U.S. Patent Application Publication No. 2008/0014830 A1 ("Sosnovskiy", herein incorporated by reference in its entirety), one or more cameras, one or more pressure sensors, and light-sensing or light-breaking systems. In some embodiments, a portion of the bottom of the product packaging 108 may be colored to indicate one or more properties of the product 104, such as the color of the product 104 within the packaging 108. A light-emitting diode-based sensor such as ones made using a light emitting diode (LED) (part no. 03HBb101CRGA00) and phototransistor (part no. WPTS-332) from WAITRONY OPTOELECTRONICS LTD may detect the color of the bottom of the package 108, or a pattern such as a bar code or a QR code, and relay that information to the control device 206.

Figure 3:
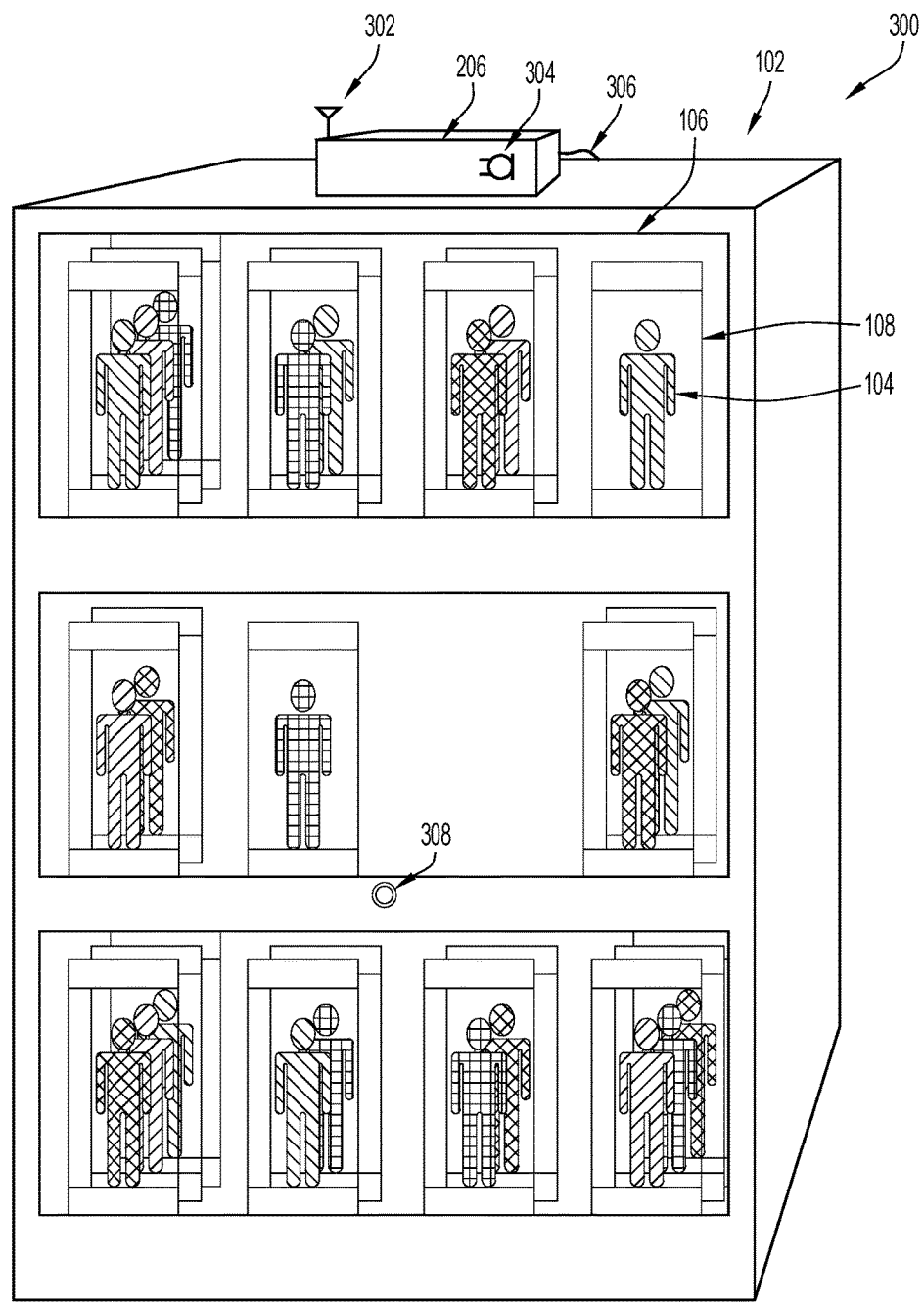
FIG. 3 is an illustration of the interactive point of purchase product display according to one embodiment of the present invention.

FIG. 3 is an illustration 300 of an interactive point of purchase product display 102 according to one embodiment of the present invention. The product display 102 in this example includes products including the product 104 in the packaging 108, shelves including the shelf 106, and the interactive experience control device 206.

The control device 206 coordinates an interactive experience between, e.g. the products, the product display 102, and the potential consumer. In this example, the control device 206 includes a computer with a processor and memory located on top of the shelves. In other embodiments, the control device 206 may be a circuit board or processor, may be positioned at other locations in or around the shelves 104, may be communicably connected to the products and the product display 102 from a remote location, or may be integrated into one or more of the products or product packaging 108.

The computer may receive input data from one of several input devices. The input devices may include a radio frequency antenna 302, a microphone 304, a computer keyboard, joystick or mouse, a keypad, a touchscreen, a memory port, such as a USB connection, a wired connection 306, such as a wired network connection or a wired electrical connection, a wireless connection, such as a wireless network connection, and an optical receiver, such as an infrared sensor or a camera 308 among other things. In some embodiments, the computer receives data about a potential consumer from information gathered on the Internet. For example, a consumer may upload their toy preferences to a secure server, and the computer may access the toy preferences from the secure server. The input data may include toy preference data. Alternatively, the input data may include content update data, such as data on coordinating an interactive experience.

Various components in and around the shelves may be communicably coupled to the control device 206 such that the control device 206 may provide an interactive experience to the potential consumer. For example, the control device 206 may send a signal to a product 104 that has an audio speaker and cause the speaker in the product to play a sound file and "talk" to the potential customer. In some embodiments, the control device 206 may coordinate a simulated conversation among several of the products, similar to that disclosed in Wright. The conversation may be customized to the potential consumer and may lead to a presentation of the selected product 104 to the consumer. From the consumer's point of view, for example, the products may appear to argue among themselves about which product is the most appropriate for the consumer. The arguments may include phrases that insert the consumer's name. The arguments may appear to continue until a consensus is achieved, whereby the selected product announces that "I am the best one for you, Alice!" The potential consumer gains a level of entertainment and of familiarity with the product 104 even before a purchase is made. Alternatively, the interactive experience may conclude with the control device 206 sending a signal that causes an output device to recommend an accessory product, a companion product, or another product altogether. The control device 206 may recommend that the consumer visit another display in the store, including other interactive product displays.

The control device 206 may initiate responses to the consumer's actions. For example, should the potential consumer pick up the selected product 104, the control device 206 may send signals initiating the remaining products to appear to applaud or cheer. Should a potential consumer walk away before taking a product 104 off the shelf 106, the control device 206 may send signals initiating the products to convey disappointment or to appear to plead to the potential consumer to come back. Should a potential consumer select a product different from the one selected by the product display 102, the control device 206 may send signals (e.g., to one or more of the selection indicators 108) initiating the remaining products to convey an appropriate response that may be different from the above responses.

Figure 4:
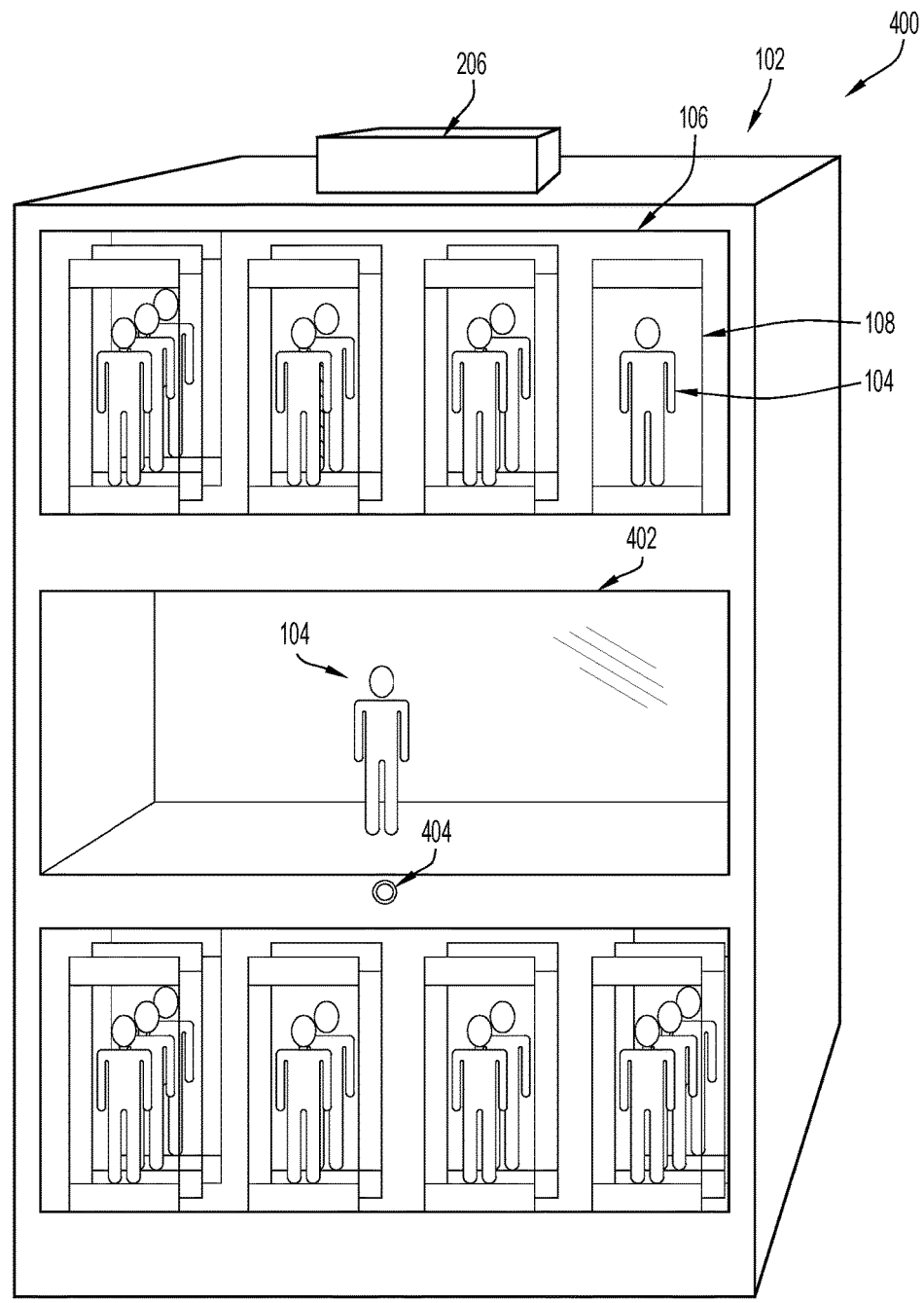
FIG. 4 is an illustration of an alternate embodiment of the interactive point of purchase product display.

FIG. 4 is an illustration 400 of an alternate embodiment of an interactive point of purchase product display 102. The product display 102 in this example includes products including product 104 in packaging 108, shelves including shelf 106, and a diorama 402. The diorama 402 may be a controlled area where a product 104 is displayed outside of its packaging 108. In the controlled area, various features of the product 104 may be demonstrated that may not otherwise be demonstrable while the product 104 is within its packaging 108. The controlled area of the diorama 402 also obviates the need for a live human demonstrator. In this example, the diorama includes a product 104 behind a pane of glass or translucent plastic. A potential consumer may activate the demonstration of the product 104 by pushing an activation button 404 near the diorama 402. Pushing the activation button 404 may send an activation signal to activation circuitry, either in the diorama 402 or in the product 104, to initiate a demonstration of the product features. In one embodiment, the product features include dancing or gyrating wildly, or movement along a set pathway within the diorama 108.

The activation button 404 of the diorama 402 may also serve as an input device 204 for the interactive experience control device 206. Upon activation of the feature demonstration, or upon completion of the demonstration, the control device 206 may send signals initiating a conversation banter routine among the products or signals initiating a selection indicator. The control device 206 may also be communicably coupled to the diorama 402 or the product 104 in the diorama 402. The control device 206 may then include it in any interactive presentations provided to the potential consumer.

Figure 5:
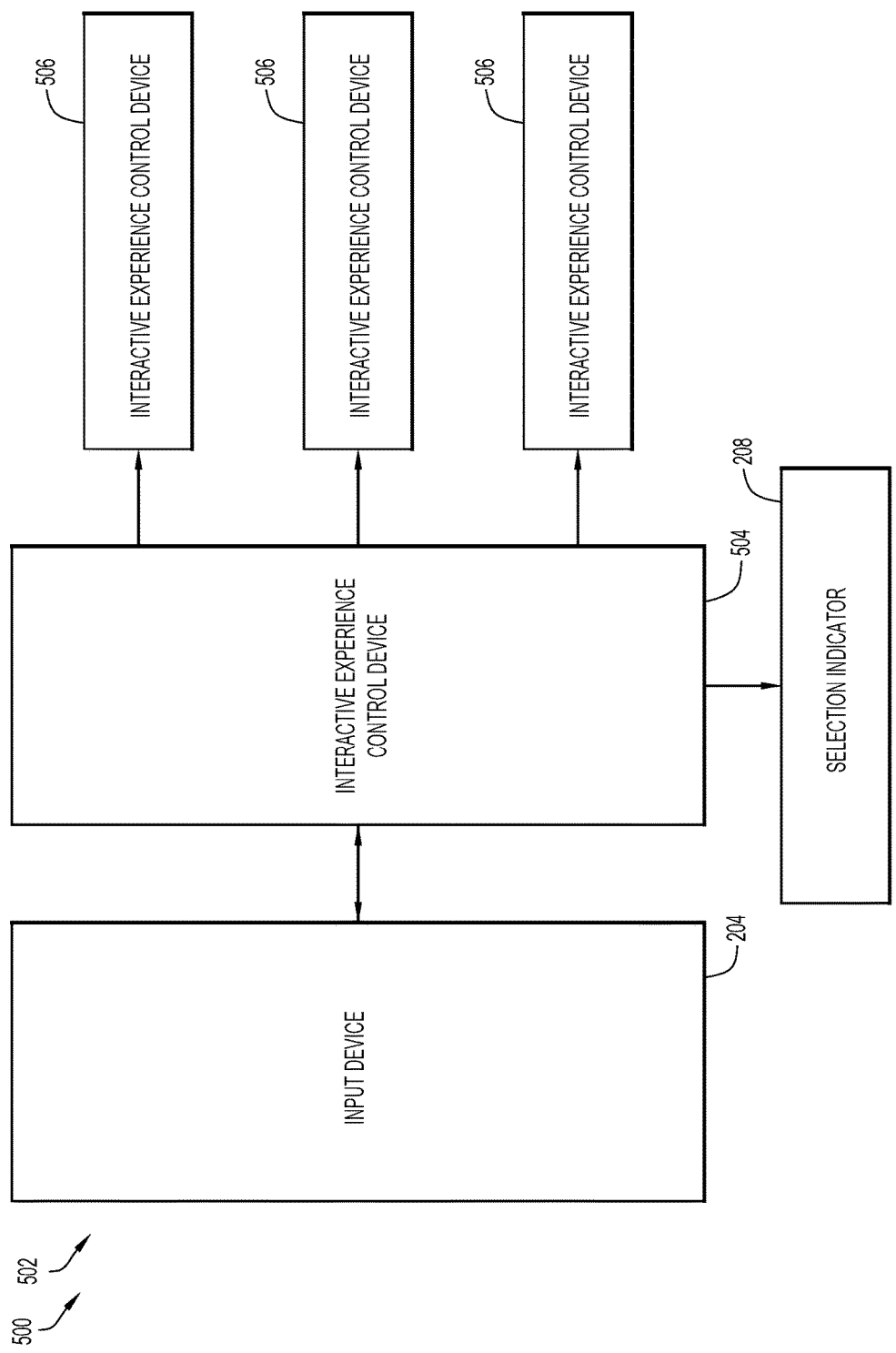
FIG. 5 is a diagram of an alternative control system for the interactive point of purchase product display according to one embodiment of the present invention.

FIG. 5 is a diagram 500 of an alternative control system 502 for an interactive point of purchase product display 102 according to one embodiment of the present invention. The control system 502 includes the input device 204, a selected interactive experience control device 504, the selection indicator 208, and one or more secondary interactive experience control devices 506. The selected control device 504 receives data from the input device 204 indicating that it has been selected. In some embodiments, the input device 204 is a microphone, and the microphone receives a modulated signal with a base frequency of around 18 to 20 kHz. The modulated signal may have been generated, e.g. by an application running on a smart phone, such as a BLACKBERRY™ by RESEARCH IN MOTION or an IPHONE™ by APPLE, of the potential consumer. The input device transmits ("sends") data associated with the modulated signal to the selected control device 504, which processes the modulated signal to determine that it has been selected.

The selected control device 504 may determine that it has been selected through an arbitration process. For example, the control devices 504, 506 may all receive data associated with an input signals (or a same selection signal). The data associated with the input signal or selection signal may activate a timer within each control device 504, 506. The timer values may differ among the various control devices 504, 506. Once the timer of a control device 504, 506 reaches a certain value (e.g. counts down to 0) without receiving a separate signal from any of the other control devices that control device may declare itself the selected control device 504.

The selected control device 504 may cause a signal to be sent back to the smart phone. The signal may be sent via WiFi, radio frequency, ultrasonic or near-ultrasonic frequency, Bluetooth, and 4G standards, among others. The signal received by the smart phone may unlock features on the smart phone. For example, the signal may unlock a collectible badge, a new game or a previously inaccessible feature or character on an existing game, or trigger an augmented reality environment, among other things. The signal may cause the smart phone to download additional content from a server, such as additional marketing or advertising information or a coupon.

The selected control device 504 may send a signal to the other (e.g., "secondary") control devices 506 that indicates that the selected control device 504 has been selected and/or that the secondary control devices 506 have not been selected. For example, the selected control device 504 may generate a "back-off" signal that may be in the form of a second modulated signal with a base frequency of around 18 to 20 kHz that is received by an input device associated with each of the secondary control devices 506. The selected control device 504 may send the back-off signal to the other control devices 506 to indicate to the other control devices that the selected product has been selected. The selected control device 504 may also send a signal activating the selection indicator 208 to indicate to a potential consumer that a product 104 associated with the selection indicator 208 has been selected.

Figure 6:
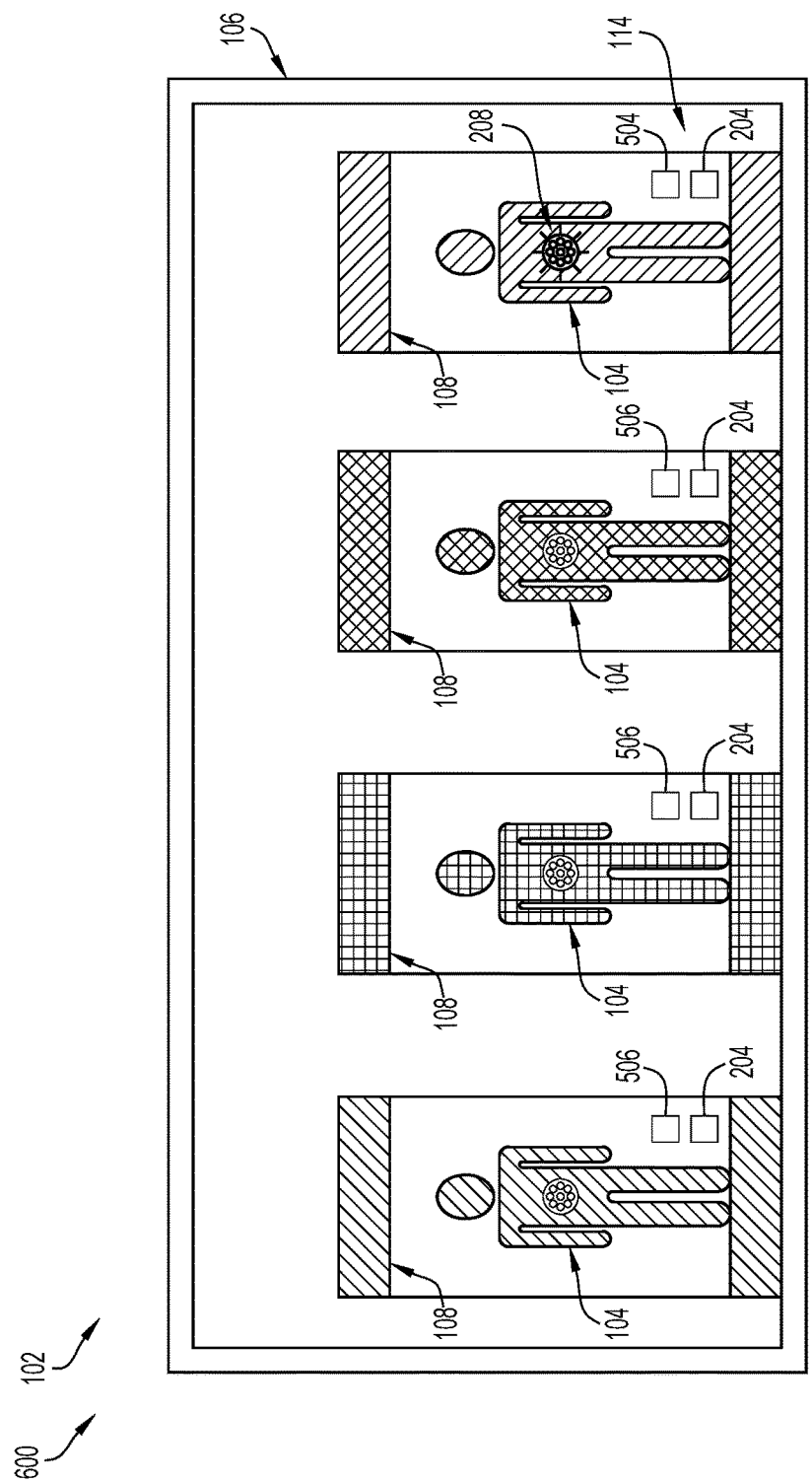
FIG. 6 is an illustration of an alternative interactive point of purchase product display indicating the selection of a product for a potential consumer or customer.

FIG. 6 is an illustration 600 of an alternative interactive point of purchase product display 102 indicating the selection of a product 104 for a potential consumer. The alternative product display 102 may be suited for the alternative control system 502. The input device 204 associated with the selected control device 504 receives an indication that it has been selected. The selected control device is associated with a selected product 104. The input device 204 passes data associated with the indication along to the selected control device 504. The selected control device 504 sends a signal (e.g., the "back-off" signal) to the secondary control devices 506 that they are to back-off and not activate any selection indicators. The selected control device 504 then sends a signal activating its own selection indicator 208.

Figure 7:
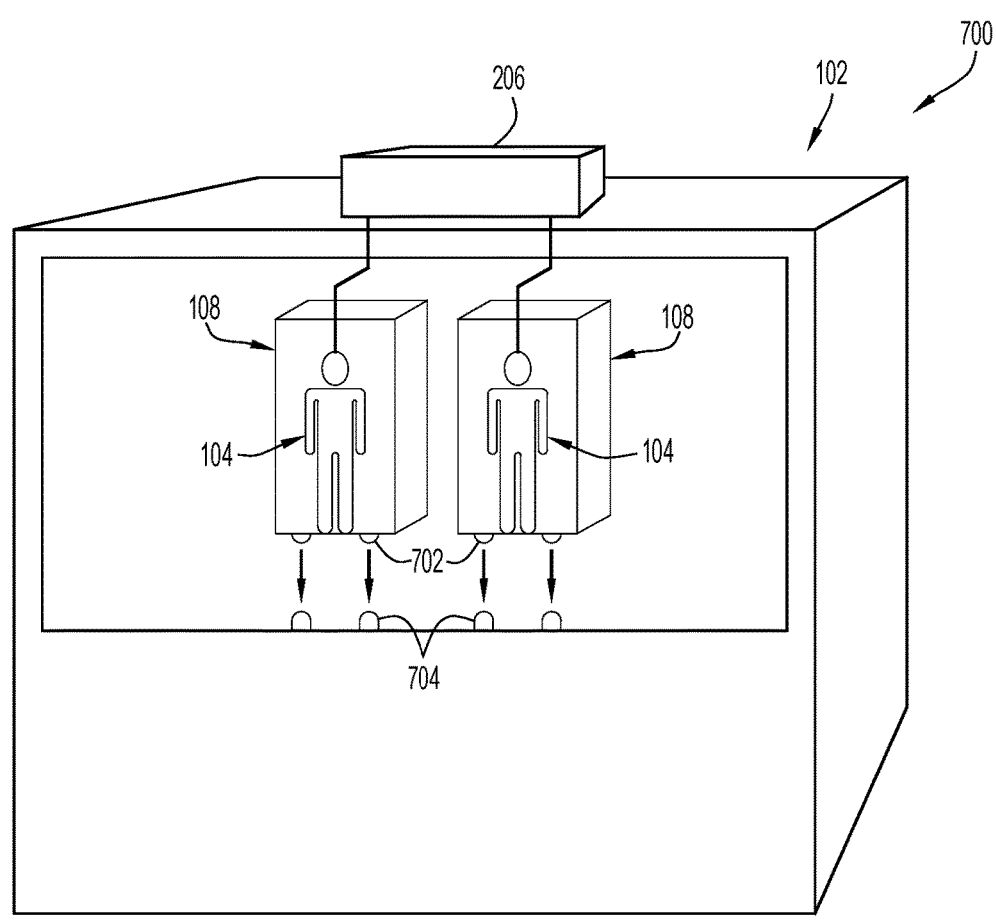
FIG. 7 is an illustration of an embodiment of the interactive point of purchase product display configured with electrical interconnects disposed in a product placement region and configured to couple to corresponding electrical connectors on the product or packaging thereof.

FIG. 7 is an illustration 700 of an embodiment of the interactive point of purchase product display 102 showing the products 104 electrically connected to the control device 206. It should be appreciated that the control device 206 may also be configured as one of the control devices 504 or 506, described above. In FIG. 7, the products 104 are configured with electrical connectors 702 that are configured to couple with electrical interconnects 704 that are disposed in the product placement region of the interactive point of purchase product display 102 and that are electrically coupled to the control device 206. For example, the products 104 are electrically connected to the control device 206 through two metal (e.g., steel) contacts located at the bottom of the products 104, though it should be appreciated that the products 104 may be electrically connected to the control device 206 through any number of contacts located anywhere on the products 104. In one example, two contacts may be used to deliver power from the control device 206 to the products 104, while other (or the same contacts) contacts may be used to detect a presence of the products 104 and to deliver control signals from the control device 206 to the products 104. In some embodiments, the electrical interconnects 704 are arranged in a fixed pattern within a product placement region. The fixed pattern of the electrical interconnects 704 provide a placement pattern for the products 104 with the electrical connectors 702.

Figure 8:
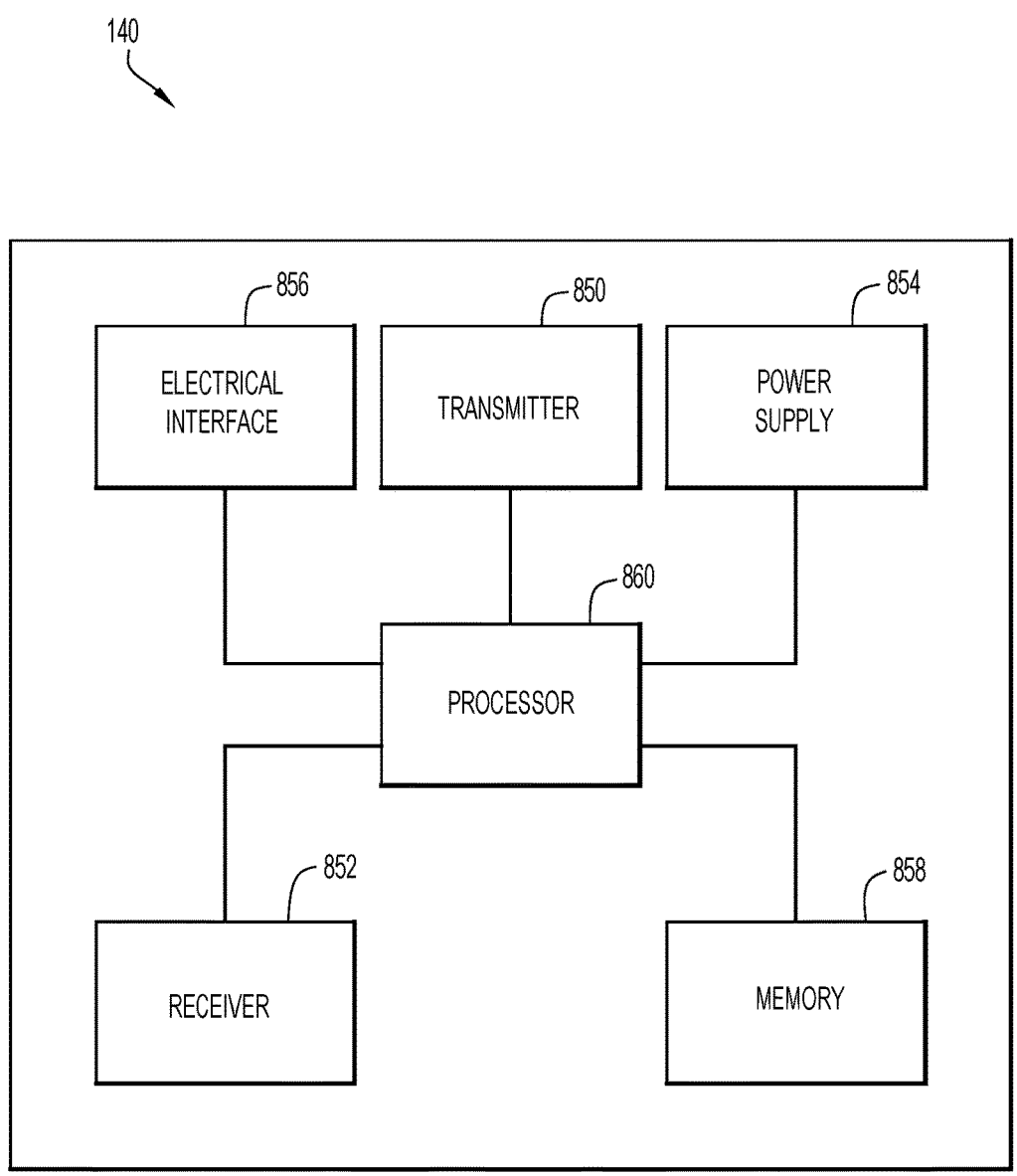
FIG. 8 is an illustration of an embodiment of the product or packaging thereof configured with a transmitter and receiver unit and an electrical interface unit.

Reference is now made to FIG. 8, which shows the product 104 configured with a transmitter unit 850, a receiver unit 852, a power supply 854, an electrical interface unit 856, a memory 858 and a processor 860. The transmitter unit 850 and the receiver unit 852 are configured to send and receive wired or wireless signals to the control device 206, as described later herein. The power supply 854 is configured to provide power to operate the product 104 (e.g., to supply power to the transmitter unit 850, receiver unit 752 and processor 760). In one example, the power supply 854 may be a battery or series of batteries and, as described in more detail hereinafter, the control device 206 is able to deliver power to the power supply 854 in order to recharge the power supply 854. The electrical interface unit 856 is configured to connect the electrical connectors 702 to electrically interface with the control device 206. The processor 860 is configured to control operations of the product 140 (e.g., mechanical, audio, etc. toy operations or functionalities), and the functions of processor 860 may be implemented by logic encoded in one or more tangible media or storage devices (e.g., memory devices such as compact discs, digital video discs, flash memory drives, etc. and embedded logic such as an application specific integrated circuit (ASIC), digital signal processor (DSP) instructions), wherein memory 858 stores data used for the computations or functions for the product 140 described herein. Thus, the operations performed by the product 140 may be implemented with fixed logic executed by a processor.

Figure 9A:
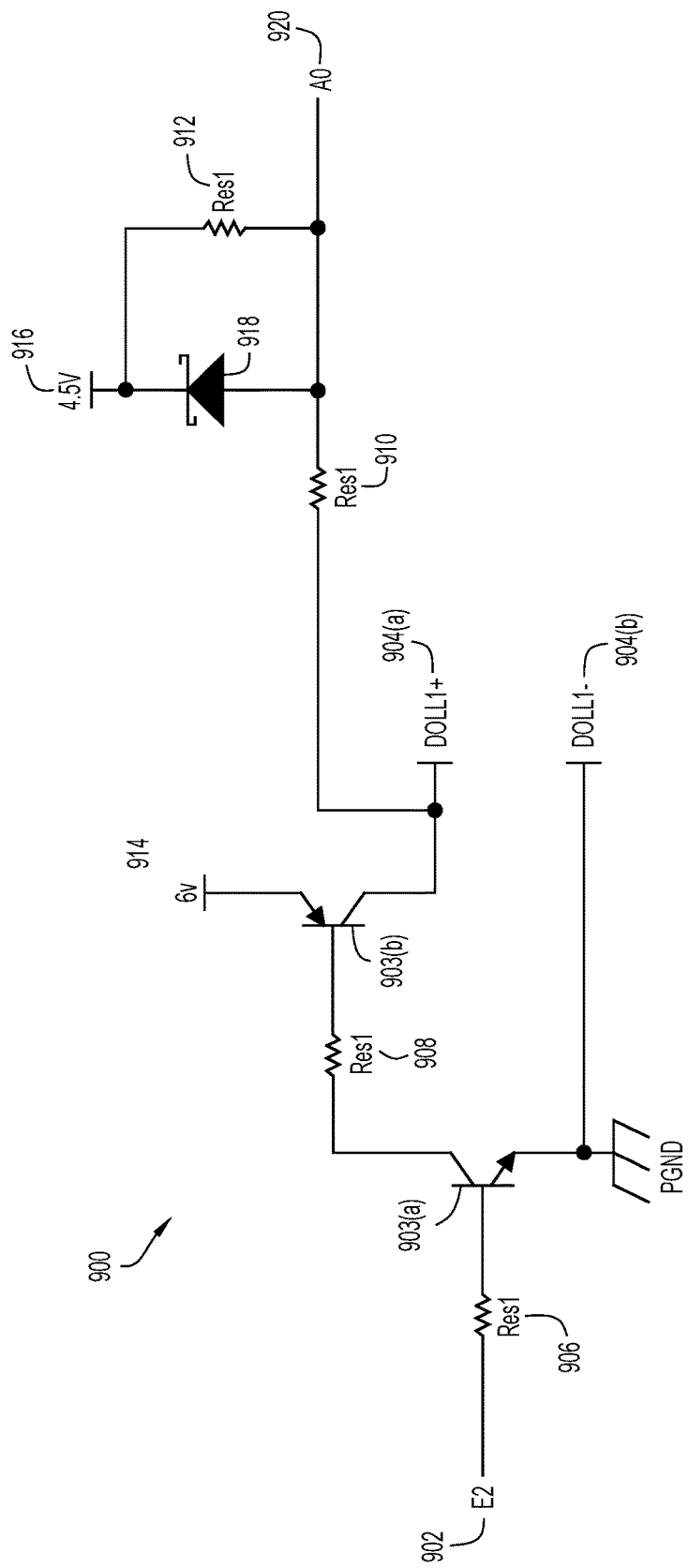
FIGS. 9A and 9B are illustrations of schematic circuit diagrams showing the electrical connectivity between a control device ("controller device") and the product for power delivery and command communications from the control device to the product.
Figure 9B:
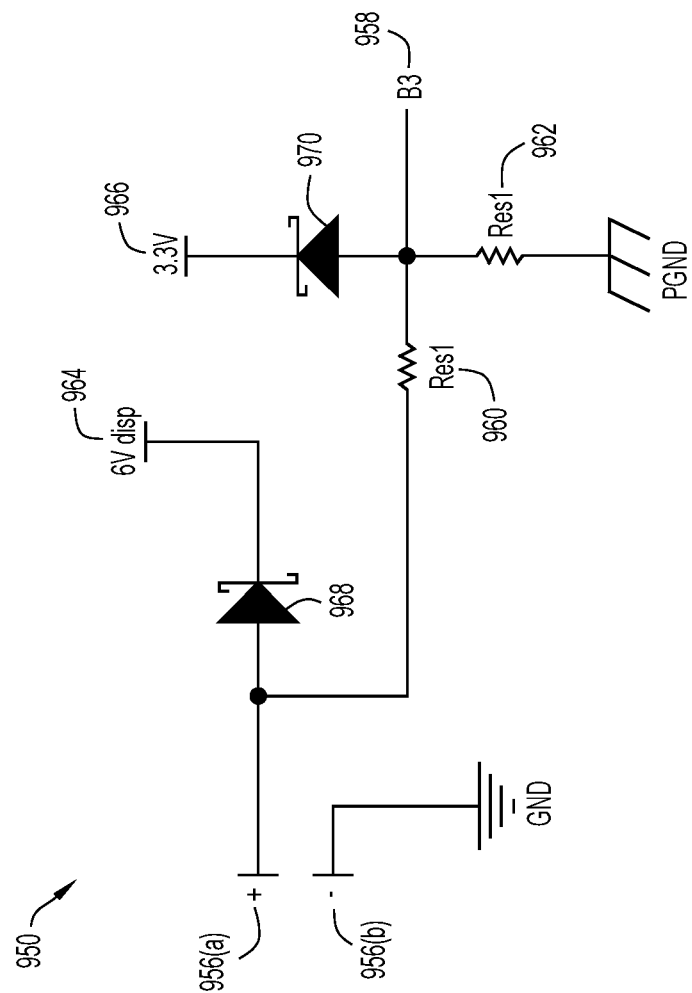

FIGS. 9A and 9B are illustrations of schematic circuit diagrams showing the electrical connectivity between the control device 206 and the product 104 for power delivery and command communications from the control device 206 to the product 104. The control device 206 may be a display device that is configured to deliver power, identify the presence or absence of the product 140 and provide communications (e.g., commands) to the product 140. The control device 206 (not shown in FIGS. 9A and 9B) may be configured with a plurality of pins that are configured to electrically interface the control device 206 with the product 140 via the electrical interconnects 704 described in connection with FIG. 7 above.

As an example, FIG. 9A shows a schematic circuit diagram 900 for the control device 206 which may be configured as a display unit. At reference point E2 (shown at reference numeral 902) in the circuit diagram, the control device 206 may supply a voltage (e.g., a high voltage or a low voltage) to supply power from a power supply (e.g., power supply 914) to the product connections (e.g., by turning "on" appropriate transistors 903(*a*) and 903(*b*)), shown at reference numerals 904(*a*) and 904(*b*). The product connections 904(*a*) and 904(*b*) are, for example, coupled to the electrical interconnects 704 in the product placement region and are configured to interface with the electrical connectors 702 of the product 140, described above in connection with FIG. 7.

For example, when the control device 206 provides a high voltage at reference point E2, transistors 903(*a*) and 903(*b*) turn "on", and power is supplied from power supply 914 to the product connections 904(*a*) and 904(*b*). If the product 140 is attached to these product connections, the control device 206 can deliver power to the product 140, for example, to recharge the power supply 854 of the product 140. Also at reference point E2, the control device 206 may supply a voltage amount to determine the presence or absence of a product 140 (e.g., if a product is connected to the control device 206) by measuring the voltage level of reference point 920 at, e.g., reference A0. In one example, the control device 206 may supply a low voltage at reference point E2, and if the voltage level of reference point A0 is low (e.g., an "off" state), the control device 206 will determine that the product 140 is present (e.g., electrically coupled or "attached") to the control device 206, while if the voltage level of reference point A0 is high (e.g., an "on" state), the control device 206 will determine that the product 140 is not attached.

The presence or absence of a product may be displayed on a display unit and/or may be used to determine which product is to be detected by the control device 206. FIG. 9A shows resistors 906, 908, 910 and 912 configured to be arranged in the schematic 900 to ensure proper operation. Similarly, FIG. 9A shows power supplies 914 and 916 and diode 918 to ensure proper circuit operation.

FIG. 9B shows an example circuit schematic 950 for the product 140. Reference numerals 956(*a*) and 956(*b*) show points of contact (e.g., the electrical connectors 702) between the product 140 and the control device 206. For example, points of contact 956(*a*) and 956(*b*) are configured to interface with product connections 904(*a*) and 904(*b*), respectively, in FIG. 9A. In one example, the circuit schematic diagram in FIG. 9B enables communications from the control device 206 to the product via reference point B3 (shown at reference numeral 958), such that the control device 206 can send electrical signals to the product 140 to control operations of the product. For example, the control device 206 can send selection signals to the selection indicator devices of the product 140 through an electrical connection at reference point B3. Similarly, the control device 206 can send control signals to the product 140 at B3 to control operations (e.g., mechanical, audio, etc.) of the product 140. FIG. 9B also shows resistors 960 and 962, power supplies 964 and 966 and diodes 968 and 970 to ensure proper circuit operation.

In one exemplary embodiment, a processor 214 in the control device 206 sends an electrical signal to a product 140 instructing the product to activate mechanically. The electrical signal appears at reference point E2 902. The signal activates the transistors 903(*a*) and 903(*b*), and the electrical signal appears at product connections 904(*a*) and 904(*b*). When a product 140 is present and connected to the control device 206, the electrical signal from the control device 206 at product connections 904(*a*) and 904(*b*) also appears to the product 140 at points of contact 956(*a*) and 956(*b*). That electrical signal appears to a processor at the product 140 at reference point B3 958. The processor may then actuate mechanical movement of the product 140 in accordance with the instructions sent by the control device 206.

Figure 10:
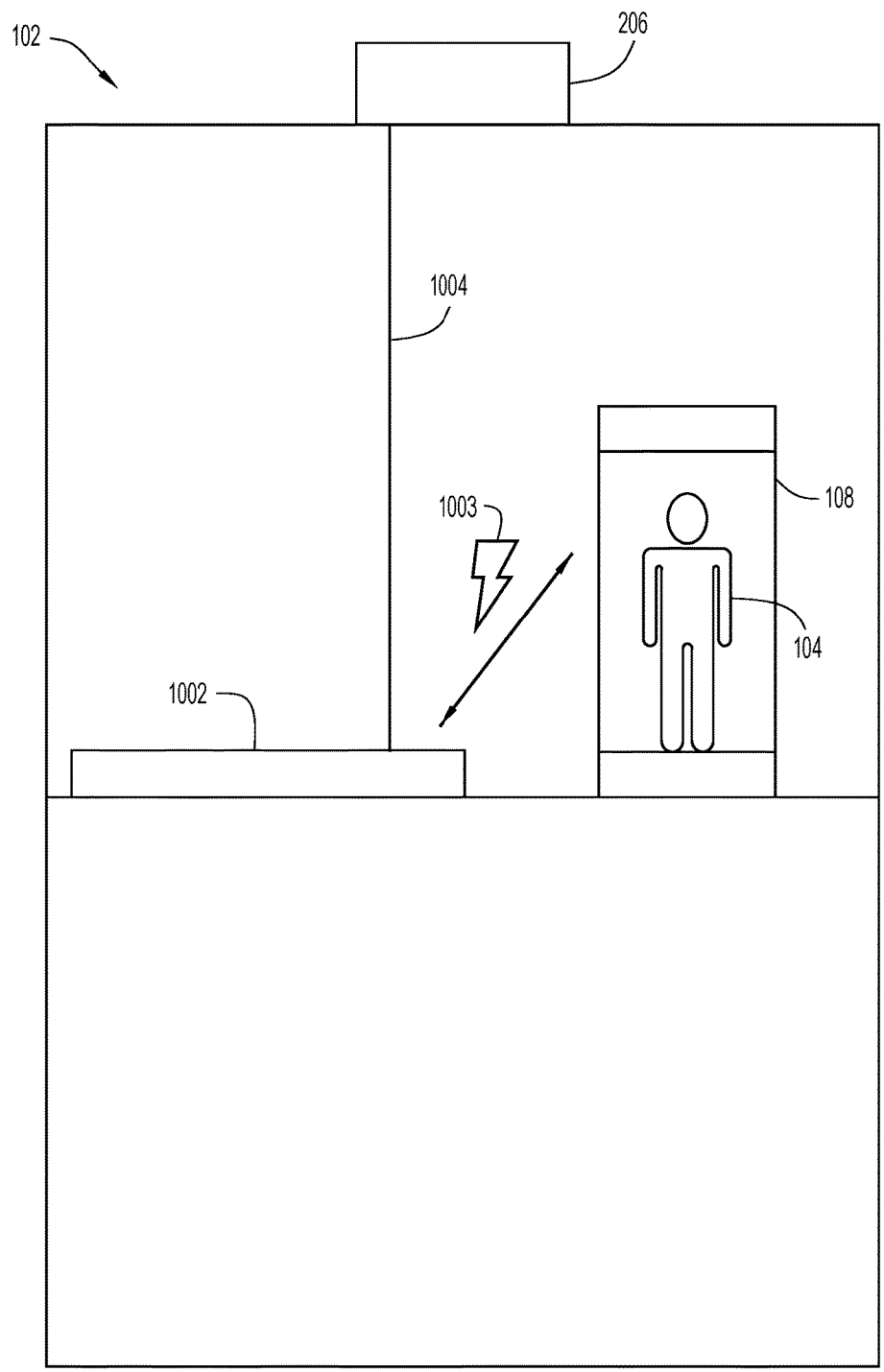
FIG. 10 is an illustration of an embodiment of the interactive point of purchase product display configured with an electrically conductive medium disposed in the product placement region that is configured to operate as an antenna to communicate wirelessly with signals from the product.

Reference is now made to FIG. 10, which shows an illustration of an embodiment of the interactive point of purchase product display 102 configured with an electrically conductive medium disposed in the product placement region of the display. FIG. 10 shows a control device 206 that is configured to electrically connect with an electrically conductive medium (e.g., a sheet of metal foil) shown at reference numeral 1002. The connection between the electrically conductive medium 1002 and the control device 206 is shown at 1004. The electrically conductive medium 1002 may act as an antenna that is configured to receive electrical signals from the control device 206 and that is configured to receive signals from the product 104 wirelessly. As shown in FIG. 10, the product 104 may be located at a distance near the electrically conductive medium 902 and may communicate with the control device 206 via wireless signals (depicted by reference numeral 1003) sent from and received by the electrically conductive material 1002 without contacting the material itself. In another example, the product 104 may be in contact with the electrically conductive medium 1002 to communicate with the control device 206.

The control device 206 may communicate with the product 140 via the electrically conductive medium 1002 acting as an antenna according to a transmission impulse communication (TIC) communication protocol. In one example, the TIC protocol is a 5 KHz communication protocol for sending and receiving wireless commands through a conductive environment. The electrically conductive medium 1002 may serve as this conductive environment and, for example, may be a conductive film similar to a sheet of aluminum foil or may be the product shelf 106 itself (shown in FIG. 1 above). The electrically conductive medium may take on any form and may be two or three dimensional.

In one example, the control device 206 sends a control signal to the product 104 via the electrically conductive medium 1002 in order to initiate controls wirelessly for the product 104. Similarly, the product 104 may transmit response signals wirelessly to the control device 206 via the electrically conductive medium 1002. In this example, the transmitter unit 850 of the product 140 is configured to send wireless signals, and the receiver unit 852 is configured to receive wireless signals. The power supply unit 854 of the product 140 is configured to power the transmitter unit and the receiver unit. The transmitter unit 850, receiver unit 852 and power supply unit 854 are not shown in FIG. 10, but they are described in connection with FIG. 8, above. The transmitter unit 850 and receiver unit 852, for example, may be configured to send and receive RF signals or low frequency signals (e.g., 5 KHz and 38 KHz) according to the TIC protocol. The transmitter unit 850 and receiver unit 852, for example, may consist of a resistor, diode and inductor unit. In one example, the electrically conductive medium 1002 may be aluminum foil, silver, copper, gold, iron, steel, brass, bronze, mercury, graphite, water and concrete. Thus, the electrically conductive medium 1002 enables wireless communications between the product 140 and the control device 206 such that the control device 206 can send the selection signal or other control signals wirelessly to one or more selection indicators 208 of the product 140.

Figure 11:
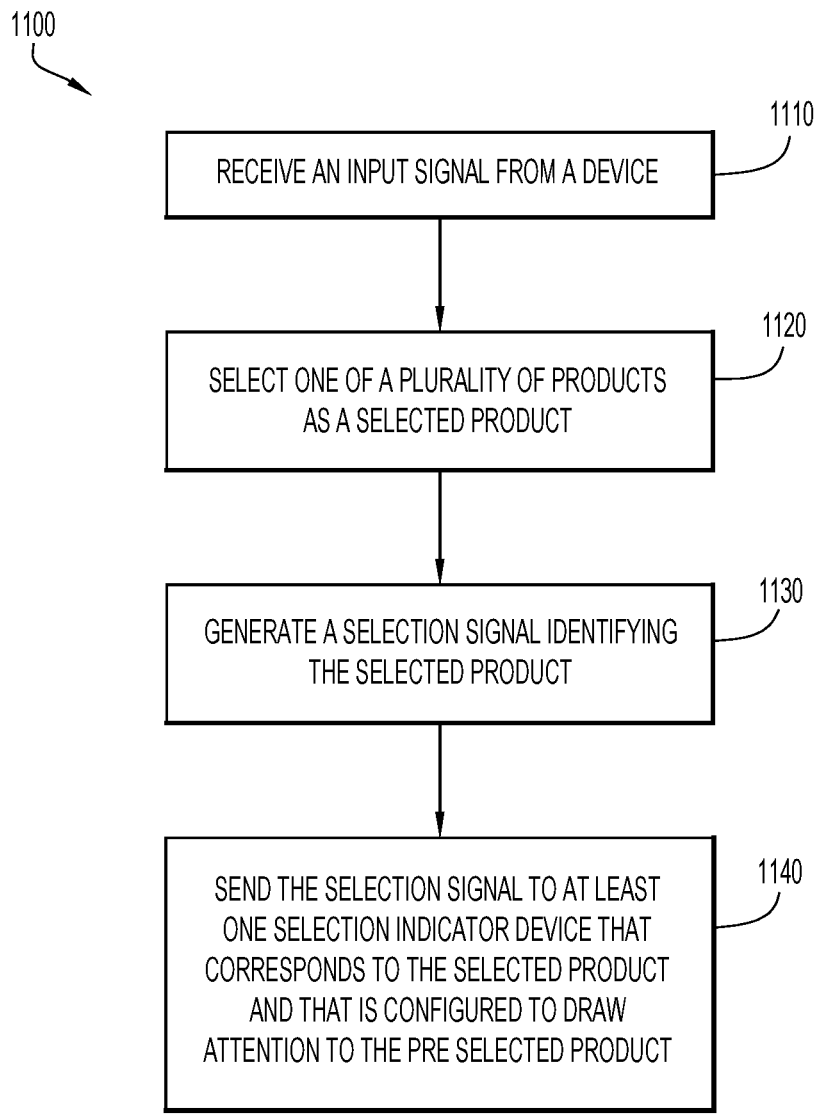
FIG. 11 is a flowchart for an exemplary process for selecting the product at the interactive point of purchase product display and sending a selection signal to a selection indicator device to draw attention to the product.

FIG. 11 is a flowchart 1100 for an exemplary process for selecting the product at the interactive point of purchase product display 102. For example, the process may be performed by using one or more of the systems described above, and may be performed by hardware, software or a combination of the two. For example, at operation 1110, the control device 206 receives an input signal from an input device (e.g., input device 204) and at operation 1120, selects one of a plurality of products as a selected product in response to receiving the input signal. At operation 1130, the control device 206 generates a selection signal identifying the selected product, and at 1140, sends the selection signal to at least one selection indicator device that corresponds to the selected product and that is configured to draw attention to the selected product.

Figure 12:
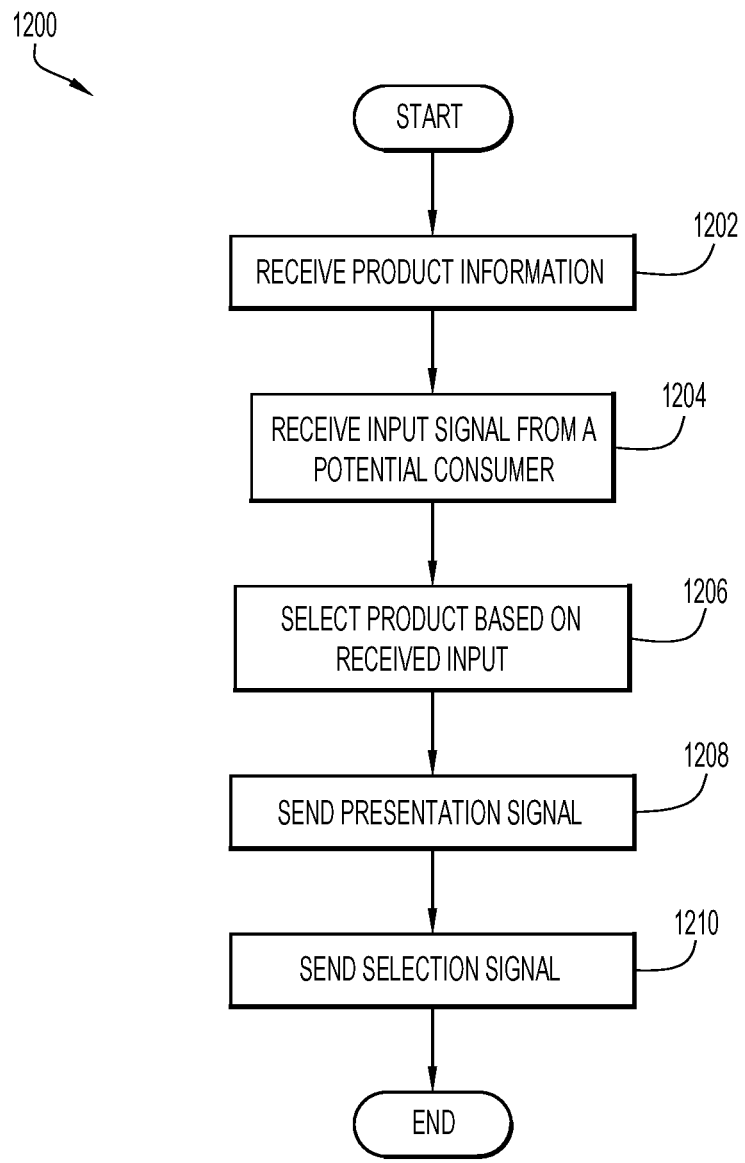
FIG. 12 is a flowchart for an exemplary process of selecting the product for a potential consumer at the interactive point of purchase product display.

FIG. 12 is a flowchart 1200 for an exemplary process of selecting a product for a potential consumer at an interactive point of purchase product display. The process may be performed by hardware, software, or a combination of the two. For example, the process may be performed using one of the systems described above. The process includes receiving product information (1202). Receiving product information may include a control device receiving product information from one or more input devices. An input signal may be received from a potential customer (1204). Receiving the input signal may include receiving input data from one or more input devices indicating that a potential consumer is within an interaction range of the product display. A product is selected based on the received input (1206). Selecting a product may include selecting a product at random from known products based on the mere presence of the potential consumer. Alternatively, selecting a product may include selection of a product based on desired characteristics received from input data from the potential consumer, such as color. A presentation signal is sent (1208). Sending a presentation signal may include a control device sending an activation signal to one or more products to coordinate a simulated conversation among the products. Alternatively, sending a presentation signal may trigger an audible narrative along with an activation of one or more products to inform the potential consumer of the features of the product. For example, a different product may demonstrate a different feature common to the products, or each product may demonstrate a feature particular to that product. In some embodiments, the presentation activated by the presentation signal requests the potential consumer to provide further information about themselves, which the control device may then use to further refine the product selection. The presentation may be customized for the individual product, as well as for the potential consumer. For example, each product may have its own "personality" from which it bases its customized presentation. A selection signal is sent (1210). Sending a selection signal may include a control device sending an activation signal to one or more selection indicators to bring a potential consumer's attention to one particular product.

Figure 13:
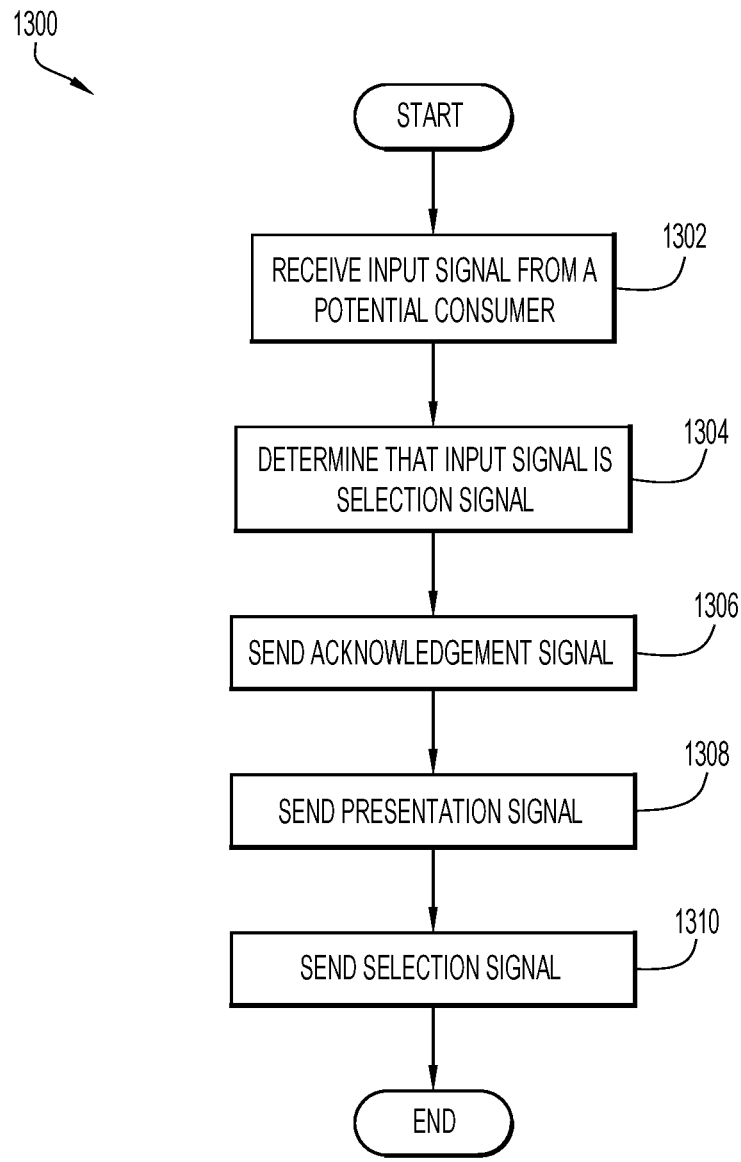
FIG. 13 is a flowchart for an alternative exemplary process of selecting the product for the potential consumer or customer at the interactive point of purchase product display.

FIG. 13 is a flowchart 1300 for an alternative exemplary process of selecting a product for a potential consumer at an interactive point of purchase product display. The process may be performed by hardware, software, or a combination of the two. For example, the process may be performed using one of the systems described above. An input signal may be received from a potential customer (1302). Receiving the input signal may include a control device receiving input data from one or more input devices indicating that a potential consumer is within an interaction range of the product display and that a product associated with the input device is a selected product. A determination is made that the input signal is a selection signal (1304). Determining that the input signal is a selection signal may include the control device processing the received signal to determine that it originated from the potential consumer and that no back-off signal has been received from other control devices. An acknowledgement signal is sent (1306). Sending an acknowledgement signal may include the control device sending a back-off signal to other control devices. A presentation signal is sent (1308). Sending a presentation signal may trigger an audible narrative along with an activation of its associated product to inform the potential consumer of the features of the product. A selection signal is sent (1310). Sending a selection signal may include a control device sending an activation signal to one or more selection indicators to bring a potential consumer's attention to its associated product.

Other embodiments have been contemplated, and the invention is not limited to those embodiments disclosed above. For example, the products may be bananas, where a potential consumer may prefer bananas with a certain degree of greenness, or alternatively a certain degree of ripe- or over-ripeness.

Other embodiments include a system for channeling and pre-processing preference data for the selection device. A pre-processing trigger drives a knowledgeable individual to a pre-processing system. The pre-processing trigger may include an electronic mail, SMS text, electronic message, advertisement or otherwise with a key to accessing the pre-processing system. The pre-processing system may provide a means for soliciting preference data and formatting the preference data into a code from which the selection device may more easily access and retrieve the preference data. In some embodiments, the electronic message may include a uniform resource locator (URL) of a webpage on the Internet. The knowledgeable individual, who may be a consumer, may access the URL through a web browser on a home computer. The pre-processing system may provide a prompt for the preference data. For example, the webpage may ask the consumer for their name and favorite color. The knowledgeable individual may provide the pre-processing system with the preference data. For example, a consumer may enter their name and favorite color to the webpage. The pre-processing system may then format the preference data into a code. In some embodiments, the webpage may provide the consumer with a two-dimensional bar code. The code may be presented to the selection device. For example, the consumer may print out the two-dimensional bar code and present it to an interactive point of purchase product display. The interactive point of purchase product display may use the preferences embodied within the code to aid in the selection process. In other embodiments, the webpage may provide the consumer with an image or picture encoded with the preference data, such as through steganography, watermarking, or non-bar code patterns. The image data may be created and/or accessed at a consumer's residence, or it may be created and/or accessed at the point of purchase. The image data may be printed or downloaded at the point of purchase for use with the product display.

Yet other embodiments include a system for channeling and post-processing preference data. An interactive experience control device may store or log data about consumers' interactions or actuations with an interactive point of purchase product display. The data may be processed to provide useful analytics. For example, the data may be used to determine whether products matching a particular preference pattern should be restocked more frequently. Such data may be processed by the interactive experience control device, or it may be sent to a separate processor. In some embodiments, the data may be sent via a network connection to a remote server. In other embodiments, the product display includes a docking station for consumer electronics, such as an IPHONE, and the control device of the product display uses a network connection of the consumer electronics to send data to a remote server.

It is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any description recites "a" or "a first" element or the equivalent thereof, such disclosure should be understood to include incorporation of one or more such elements, neither requiring nor excluding two or more such elements.

While various embodiments of the skills game have been described, it will be apparent to those of ordinary skill in the art that many more embodiments and implementations are possible within the scope of the invention. Thus, it is intended that the present invention covers modifications and variations of this invention provided they come within the scope of the appended claims and their equivalents.

What is claimed is:

1. A method comprising:
    at a controller device, receiving data from an input device indicating that a potential customer has entered an interactive range of a product display that includes a plurality of individual products each associated with at least one unique selection indicator device, wherein the at least one unique selection indicator device associated with one of the plurality of individual products is different from the at least one unique selection indicator device associated with others of the plurality of individual products;
    in response to receiving the data, selecting by the controller device one and only one of the plurality of products positioned within the product display as a selected product;
    at the controller device, generating a selection signal identifying the selected product positioned within the product display;
    sending from the controller device the selection signal to the at least one unique selection indicator device that is associated with the selected product positioned within the product display such that only the at least one selection indicator device associated with the selected product is activated; and
    controlling, by the at least one unique selection indicator device that is associated with the selected product, one or more operations of the selected product in response to the selection signal.

2. The method of claim 1, wherein selecting comprises processing the data to obtain identity information associated with the potential customer that has caused the input device to send the data.

3. The method of claim 2, wherein selecting further comprises selecting the selected product based on the identity information associated with the potential customer.

4. The method of claim 2, wherein selecting comprises obtaining, based on the identity information associated with the potential customer, product criteria information associated with the potential customer from a database that stores product preferences associated with the potential customer.

5. The method of claim 1, wherein sending comprises sending the selection signal to the at least one unique selection indicator device associated with the selected product such that the at least one unique selection indicator device activates a product presentation that demonstrates at least one feature corresponding to the selected product.

6. The method of claim 1, wherein sending comprises sending the selection signal to the at least one unique selection indicator device associated with the selected product such that the at least one unique selection indicator device activates an indication to the potential customer that the potential customer should purchase the selected product.

7. The method of claim 1, wherein receiving comprises receiving the data from one of a camera device, a motion sensor device, an activation button, a bar code scanner device, an optical scanner device, a wireless receiver device, a radio frequency receiver device, a cellular communications device, a touch screen device, a computer terminal and a microphone.

8. The method of claim 1, wherein the data comprises an indication that the potential customer is within a predetermined distance range of the plurality of products.

9. The method of claim 1, wherein the data comprises image information from an encoded image detected by the input device.

10. The method of claim 1, wherein the data comprises information from a modulated signal detected by the input device.

11. The method of claim 1, wherein sending comprises sending the selection signal to the at least one unique selection indicator device associated with the selected product via wireless transmission.

12. The method of claim 1, further comprising:
    generating a back-off signal; and
    sending the back-off signal to one or more secondary control devices associated with the plurality of products within the product display, wherein the back-off signal indicates to the secondary control devices that the selected product has been selected and that the secondary control devices should not activate any selection indicators associated with the others of the plurality of individual products.

13. The method of claim 1, wherein controlling one or more operations of the selected product in response to the selection signal comprises:
    causing the selected product to at least one of move, generate an audible signal, or generate a visible signal.

14. A method comprising:
    at a controller device, receiving data from an input device, wherein the data comprises preference information associated with a potential customer, wherein the controller device is associated with a product display that includes a plurality of individual products comprising at least a first product and a second product, wherein one or more first selection indicator devices are associated with the first product and one or more second selection indicator devices are associated with the second product, and wherein the one or more second selection indicator devices are different from the one or more first selection indicator devices;
    in response to receiving the data, selecting by the controller device only the first product for the potential customer as a selected product based on the preference information associated with the potential customer;
    at the controller device, generating a selection signal identifying the first product; and
    sending from the controller device the selection signal to the one or more first selection indicator devices that are associated with the first product such that only the first selection indicator device associated with the first product is activated, wherein the first selection indicator device is configured to control one or more operations of the first product in response to the selection signal.

15. A system comprising:
    a product placement region;
    a plurality of individual products located within the product placement region;
    an input device configured to receive an input signal indicating that a potential customer has entered an interactive range of the product placement region;
    a controller device operably coupled to the input device and the product and configured to:
        receive data from the input device responsive to the input signal;

select, in response to the data, one and only one of the plurality of individual products as a selected product; and generate a selection signal identifying the selected product; and a selection indicator device operably coupled to the selected product and the controller device and configured to:

receive the selection signal from the controller device; and control one or more operations of the selected product in response to the selection signal.

16. The system of claim 15, further comprising a plurality of electrical interconnects disposed in the product placement region configured to couple to corresponding electrical connectors on the selected product to enable an electrical connection between the controller device and the selected product.

17. The system of claim 15, further comprising an electrically conductive medium disposed in the product placement region configured to operate as an antenna and to communicate wirelessly with the selected product.

18. The system of claim 17, wherein the electrically conductive medium is configured to send the selection signal wirelessly from the controller device to the selection indicator device of the selected product.

19. The system of claim 15, wherein the selection indicator device comprises a light source unit configured to illuminate the selected product in response to receiving the selection signal, an audio source unit configured to initiate audio sounds associated with the selected product in response to receiving the selection signal or a mechanical animation unit configured to provide mechanical movements for the selected product in response to receiving the selection signal.

20. The system of claim 15, wherein the controller device is integrated within the selected product.

* * * * *